United States Patent
Baba et al.

(10) Patent No.: US 12,479,425 B2
(45) Date of Patent: Nov. 25, 2025

(54) CONTROL DEVICE, CONTROL METHOD, AND STORAGE MEDIUM

(71) Applicant: HONDA MOTOR CO., LTD., Tokyo (JP)

(72) Inventors: Ichiro Baba, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 18/603,250

(22) Filed: Mar. 13, 2024

(65) Prior Publication Data

US 2024/0308503 A1     Sep. 19, 2024

(30) Foreign Application Priority Data

Mar. 15, 2023   (JP) ................................ 2023-040630

(51) Int. Cl.
*B60W 30/09*     (2012.01)
(52) U.S. Cl.
CPC .................................. *B60W 30/09* (2013.01)
(58) Field of Classification Search
CPC ... B60W 30/09; B60W 2552/53; B60W 30/12
See application file for complete search history.

(56) References Cited

U.S. PATENT DOCUMENTS

| 6,405,124 B1 * | 6/2002 | Hutton | G08G 5/34 |
| | | | 701/122 |
| 2020/0094825 A1 * | 3/2020 | Kato | G06V 20/588 |

FOREIGN PATENT DOCUMENTS

| JP | 2021099541 A | * | 7/2021 |
| WO | 2020/116265 | | 6/2020 |

OTHER PUBLICATIONS

Machine Translation of Masabumi's reference (JP-2021099541-A) (Year: 2021).*

* cited by examiner

*Primary Examiner* — Tarek Elarabi
(74) *Attorney, Agent, or Firm* — Amin, Turocy & Watson, LLP

(57) ABSTRACT

A control device includes a recognizer that recognizes a surrounding situation of a mobile body, a path generator that generates a path through which a reference position of the mobile body is to pass based on the surrounding situation, a passage area setter that sets boundary lines of a passage area of the mobile body at positions that are offset to the left and right from the path, a corrector that corrects the path based on the passage area and the surrounding situation of the mobile body, and a controller that controls a drive device provided in the mobile body such that the mobile body moves along the path corrected by the corrector, wherein when the path includes a turn, the passage area setter makes an amount of offset on an outside of the turn greater than an amount of offset on an inside of the turn.

5 Claims, 7 Drawing Sheets

CONTROL DEVICE, CONTROL METHOD, AND STORAGE MEDIUM

CROSS-REFERENCE TO RELATED APPLICATION

Priority is claimed on Japanese Patent Application No. 2023-040630, filed Mar. 15, 2023, the content of which is incorporated herein by reference.

BACKGROUND

Field of the Invention

The present invention relates to a control device, a control method, and a storage medium.

Description of Related Art

A technology for generating a travel trajectory for a route traveled by a mobile body is known in the related art. For example, Patent Document 1 describes a technology for determining a travel trajectory and speed of an own vehicle according to the width of a route on which the own vehicle travels (PCT International Publication No. WO2020/116265).

SUMMARY

However, in the technology of the related art, sufficient consideration has not been given to the fact that the passage area of the mobile body changes due to the expansion of front wheels when the mobile body is turning. Therefore, it may not be possible to appropriately generate a path for a mobile body to move on a travel road involving turns such as cranks or S-curves.

The present invention has been made in view of such circumstances and it is an object of present invention to provide a control device, a control method, and a storage medium that can more appropriately generate a path for a mobile body to move on a travel road involving turns.

A control device, a control method, and a storage medium according to the present invention adopt the following configurations.

(1) A control device according to an aspect of the present invention includes a storage medium configured to store computer-readable instructions, and a processor connected to the storage medium, the processor executing the computer-readable instructions to recognize a surrounding situation of a mobile body, generate a path through which a reference position of the mobile body is to pass based on the surrounding situation, set boundary lines of a passage area of the mobile body at positions that are offset to the left and right from the path, correct the path based on the passage area and the surrounding situation of the mobile body, and control a drive device provided in the mobile body such that the mobile body moves along the corrected path, wherein setting the boundary lines of the passage area includes, when the path includes a turn, making an amount of offset on an outside of the turn greater than an amount of offset on an inside of the turn.

(2) In the above aspect (1), the processor connects arrival points at intervals of a predetermined distance to generate the path and determines an amount by which the path is to be offset to the outside of the turn based on a position of a front wheel on the outside of the turn at a time when the reference position of the mobile body reaches each arrival point.

(3) In the above aspect (2), the processor connects arrival points at intervals of a predetermined distance to generate the path, the reference position is a center of a rear wheel axel of the mobile body, and the processor determines an amount by which the path is to be offset to the outside of the turn based on a distance from a position of a front wheel on the outside of the turn at a time when the reference position of the mobile body reaches each arrival point to a turn center which is obtained as an intersection between a reference line that passes through the reference position of the mobile body and extends to a side of the mobile body and a line perpendicular to the path.

(4) In the above aspect (1), the processor repeats setting boundary lines of a passage area of the mobile body again at positions that are offset to the left and right from the corrected path and correcting the path again based on the passage area set again and the surrounding situation of the mobile body.

(5) A control method according to another aspect of the present invention is a control method performed using a control device, the control method including recognizing a surrounding situation of a mobile body, generating a path through which a reference position of the mobile body is to pass based on the surrounding situation, setting boundary lines of a passage area of the mobile body at positions that are offset to the left and right from the path, correcting the path based on the passage area and the surrounding situation of the mobile body, and controlling a drive device provided in the mobile body such that the mobile body moves along the corrected path, wherein setting the boundary lines of the passage area includes, when the path includes a turn, making an amount of offset on an outside of the turn greater than an amount of offset on an inside of the turn.

(6) A storage medium according to another aspect of the present invention is a computer-readable non-transitory storage medium storing a program causing a processor of a control device to recognize a surrounding situation of a mobile body, generate a path through which a reference position of the mobile body is to pass based on the surrounding situation, set boundary lines of a passage area of the mobile body at positions that are offset to the left and right from the path, correct the path based on the passage area and the surrounding situation of the mobile body, and control a drive device provided in the mobile body such that the mobile body moves along the corrected path, wherein setting the boundary lines of the passage area includes, when the path includes a turn, making an amount of offset on an outside of the turn greater than an amount of offset on an inside of the turn.

According to the above aspects (1) to (6), it is possible to more appropriately generate a path for a mobile body to move on a travel road involving turns.

DETAILED DESCRIPTION OF THE INVENTION

Hereinafter, embodiments of an information processing device, an information processing method, and a storage medium of the present invention will be described with reference to the drawings. In the following explanation, a vehicle will be stated as a typical example of a mobile body, but the mobile body is not limited to a vehicle and is applicable to any type of mobile body that autonomously moves such as micromobility or robots (including those with wheels or those that walk on multiple legs).

Figure 1:
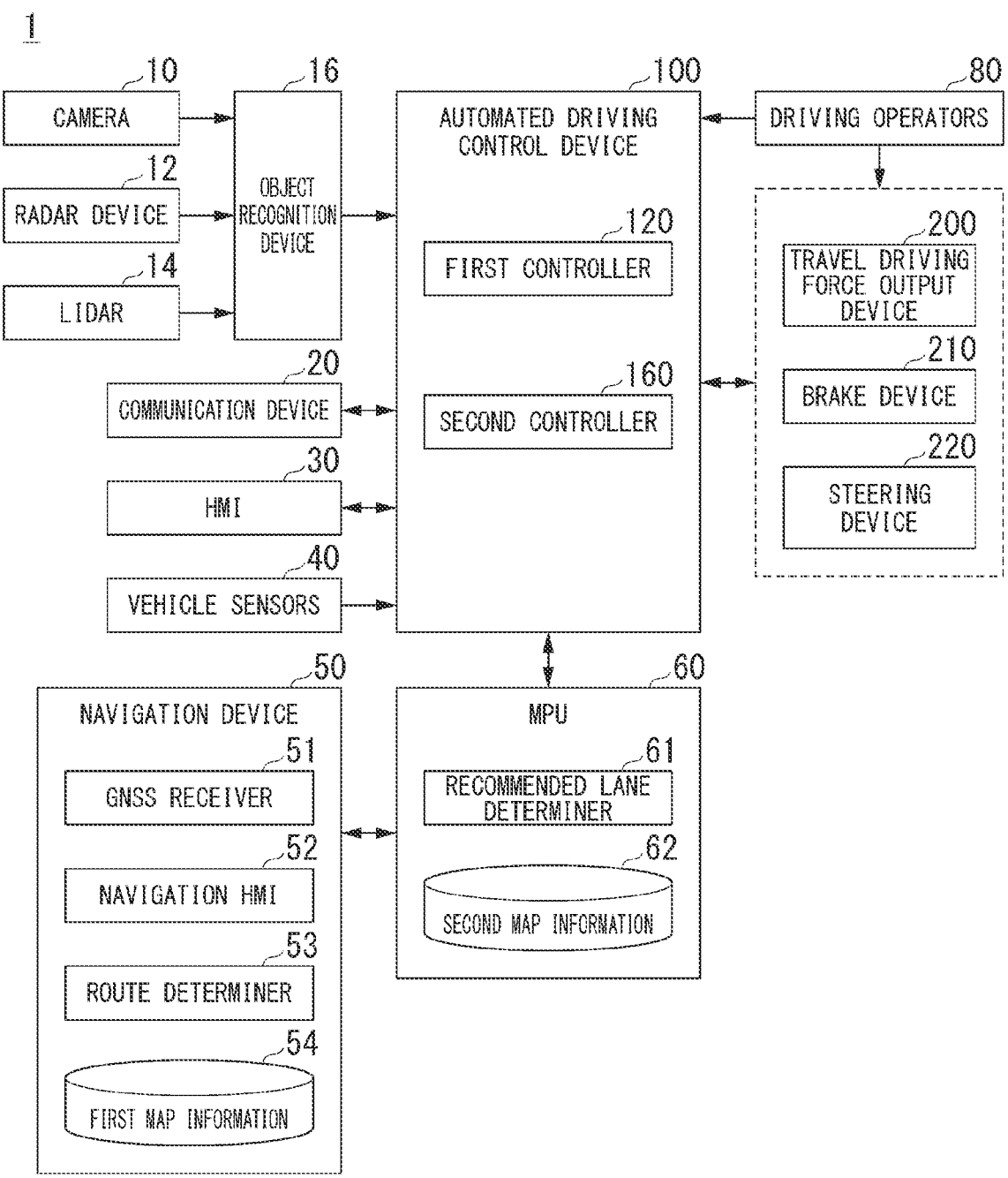
FIG. 1 is a configuration diagram of a vehicle system using a vehicle control device according to an embodiment.

FIG. 1 is a configuration diagram of a vehicle system using a vehicle control device according to an embodiment. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a light detection and ranging (LIDAR) device 14, an object recognition device 16, a communication device 20, a human machine interface (HMI) 30, vehicle sensors 40, a navigation device 50, a map positioning unit (MPU) 60, driving operators 80, an automated driving control device 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or a complementary metal oxide semiconductor (CMOS). The camera 10 is attached to a vehicle in which the vehicle system 1 is mounted (hereinafter referred to as an own vehicle M) at an arbitrary location. For imaging the area in front of the own vehicle M, the camera 10 is attached to an upper portion of a front windshield, a rear surface of a rearview mirror, or the like. For example, the camera 10 repeats imaging of the surroundings of the own vehicle M at regular intervals. The camera 10 may also be a stereo camera.

The radar device 12 radiates radio waves such as millimeter waves around the own vehicle M and detects radio waves reflected by an object (reflected waves) to detect at least the position (distance and orientation) of the object. The radar device 12 is attached to the own vehicle M at an arbitrary location. The radar device 12 may detect the position and speed of an object using a frequency modulated continuous wave (FM-CW) method.

The LIDAR device 14 illuminates the surroundings of the own vehicle M with light and measures scattered light. The LIDAR device 14 detects the distance to a target based on a period of time from when light is emitted to when light is received. The radiated light is, for example, pulsed laser light. The LIDAR device 14 is attached to the own vehicle M at an arbitrary location.

The object recognition device 16 performs a sensor fusion process on results of detection by some or all of the camera 10, the radar device 12, and the LIDAR device 14 to recognize the position, type, speed, or the like of the object. The object recognition device 16 outputs the recognition result to the automated driving control device 100. The object recognition device 16 may output detection results of the camera 10, the radar device 12, and the LIDAR device 14 to the automated driving control device 100 as they are. The object recognition device 16 may be omitted from the vehicle system 1.

For example, the communication device 20 communicates with other vehicles present near the own vehicle M using a cellular network, a Wi-Fi network, Bluetooth (registered trademark), dedicated short range communication (DSRC), or the like or communicates with various server devices via a wireless base station.

The HMI 30 presents various types of information to an occupant of the own vehicle M and receives an input operation from the occupant. The HMI 30 includes various display devices, a speaker, a buzzer, a touch panel, switches, keys, and the like.

The vehicle sensors 40 include a vehicle speed sensor that detects the speed of the own vehicle M, an acceleration sensor that detects the acceleration thereof, a yaw rate sensor that detects an angular speed thereof about the vertical axis, an orientation sensor that detects the orientation of the own vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the own vehicle M based on signals received from GNSS satellites. The position of the own vehicle M may also be identified or supplemented by an inertial navigation system (INS) using the output of the vehicle sensors 40. The navigation HMI 52 includes a display device, a speaker, a touch panel, a key, or the like. The navigation HMI 52 may be partly or wholly shared with the HMI 30 described above. For example, the route determiner 53 determines a route from the position of the own vehicle M identified by the GNSS receiver 51 (or an arbitrary input position) to a destination input by the occupant using the navigation HMI 52 (hereinafter referred to as an on-map route) by referring to the first map information 54. The first map information 54 is, for example, information representing shapes of roads by links indicating roads and nodes connected by the links. The first map information 54 may include curvatures of roads, point of interest (POI) information, or the like. The on-map route is output to the MPU 60. The navigation device 50 may also perform route guidance using the navigation HMI 52 based on the on-map route. The navigation device 50 may be realized, for example, by a function of a terminal device such as a smartphone or a tablet owned by an occupant. The navigation device 50 may also transmit the current position and the destination to a navigation server via the communication device 20 and acquire a route equivalent to the on-map route from the navigation server.

The MPU 60 includes, for example, a recommended lane determiner 61 and holds second map information 62 in a storage device such as an HDD or a flash memory. The recommended lane determiner 61 divides the on-map route provided from the navigation device 50 into a plurality of blocks (for example, into blocks each 100 meters long in the direction in which the vehicle travels) and determines a recommended lane for each block by referring to the second map information 62. The recommended lane determiner 61 determines the number of the lane from the left in which to travel. When there is a branch point on the on-map route, the recommended lane determiner 61 determines a recommended lane such that the own vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The second map information 62 may be updated as needed by the communication device 20 communicating with another device.

The driving operators 80 include, for example, an accelerator pedal, a brake pedal, a shift lever, a steering wheel, a different shaped steering member, a joystick, and other operators. Sensors for detecting the amounts of operation or the presence or absence of operation are attached to the driving operators 80. Results of the detection are output to the automated driving control device 100 or some or all of the travel driving force output device 200, the brake device 210, and the steering device 220.

The automated driving control device 100 is an example of a vehicle control device. The automated driving control device 100 includes, for example, a first controller 120 and a second controller 160. Each of the first controller 120 and the second controller 160 is realized, for example, by a hardware processor such as a central processing unit (CPU) executing a program (software). Some or all of these components may be realized by hardware (including circuitry) such as large scale integration (LSI), an application specific integrated circuit (ASIC), a field-programmable gate array (FPGA), or a graphics processing unit (GPU) or may be realized by hardware and software in cooperation. The program may be stored in advance in a storage device such as an HDD or a flash memory (a storage device having a non-transitory storage medium) of the automated driving control device 100 or may be stored in a detachable storage medium such as a DVD or a CD-ROM and then installed in the HDD or flash memory of the automated driving control device 100 by mounting the storage medium (the non-transitory storage medium) in a drive device.

Figure 2:
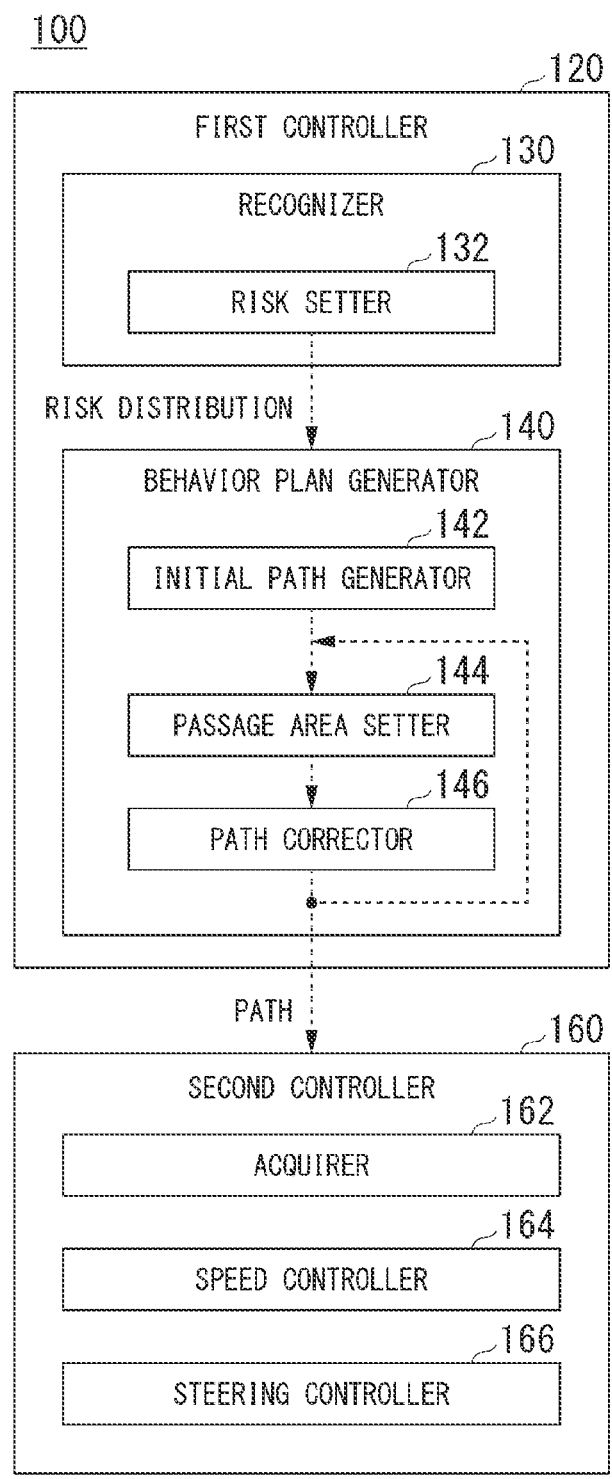
FIG. 2 is a functional configuration diagram of a first controller and a second controller.

FIG. 2 is a functional configuration diagram of the first controller and the second controller. The first controller 120 includes, for example, a recognizer 130 and a behavior plan generator 140. For example, the first controller 120 realizes a function based on artificial intelligence (AI) and a function based on a previously given model in parallel. For example, a function of "recognizing an intersection" may be realized by performing recognition of an intersection through deep learning or the like and recognition based on previously given conditions (presence of a signal, a road sign, or the like for which pattern matching is possible) in parallel and evaluating both comprehensively through scoring. This guarantees the reliability of automated driving.

The recognizer 130 recognizes states such as the position, speed and acceleration of each object present near the own vehicle M based on information input from the camera 10, the radar device 12, and the LIDAR device 14 via the object recognition device 16. Objects include both stationary objects and moving objects. The position of the object is recognized, for example, as a position in an absolute coordinate system whose origin is at a representative point on the own vehicle M, and used for control. The position of the object may be represented by a representative point on the object such as the center of gravity or a corner thereof or may be represented by an expressed region.

In the present embodiment, the recognizer 130 identifies the boundaries of an area in which the own vehicle M can travel (such as, for example, road lane lines, road shoulders, curbs, a median strip, and guardrails) and objects that the own vehicle M may come into contact with (such as, for example, pedestrians and other vehicles) based on at least an image representing a surrounding situation of the own vehicle M captured by the camera 10. The recognizer 130 recognizes the left and right road lane lines, for example, as a plurality of pieces of point cloud data and calculates the distance between point clouds that constitute the left and right road lane lines to recognize the road width.

Figure 3:
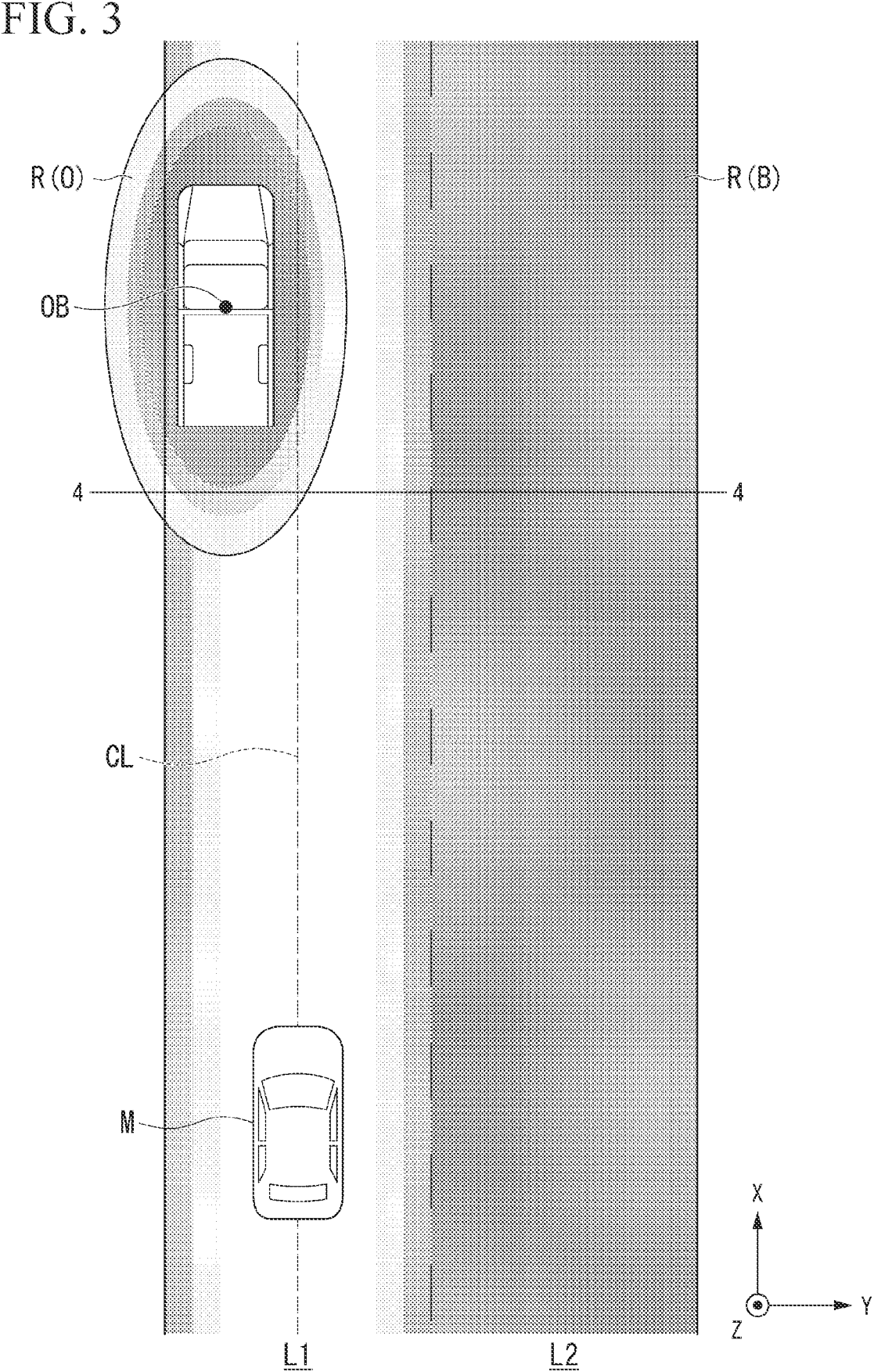
FIG. 3 is a diagram for explaining risks set by a risk setter.

The recognizer 130 includes a risk setter 132. The risk setter 132 sets a risk R, which is an index value having a more negative indication as the distance to an object recognized by the recognizer 130 decreases, on a travel road plane in an area toward which the own vehicle M advances. The risk R is an index value representing the degree to which the own vehicle M is to avoid entering a corresponding area. The travel road plane is a plane virtually viewed from above and is similar to a map. FIG. 3 is a diagram for explaining risks set by the risk setter 132. In FIG. 3, R(O) is a risk corresponding to an obstacle (for example, a parked vehicle) OB. The risk R(O) increases as the distance to the obstacle OB decreases (for example, as the distance to the center of the obstacle OB decreases) and decreases toward zero as the distance from the obstacle OB increases. In FIG. 3, R(B) is a risk corresponding to a travel road boundary. For example, the risk R(B) decreases as the distance to a center line CL of lane L1 in which the own vehicle M is located decreases, increases as the distance to the left travel road boundary decreases, and increases as the distance to the right travel road boundary decreases. However, in the illustrated situation, the value of the risk R(B) for the right travel road boundary may be set smaller than the value of risk R(B) for the left travel road boundary because it is possible to change lanes to lane L2.

Figure 4:
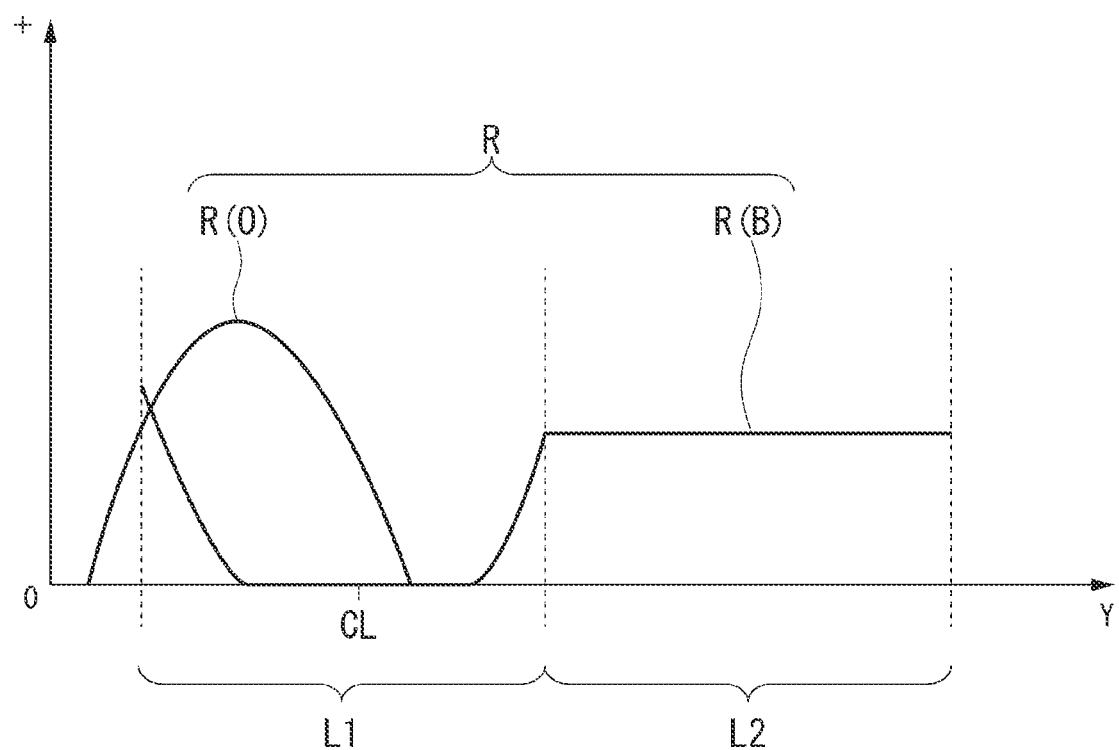
FIG. 4 shows risk values on line 4-4 in FIG. 3.

FIG. 4 shows risk values on line 4-4 in FIG. 3. The risk setter 132 calculates the risks R(O) and R(B) as described above and adds the risks R(O) and R(B) for each point to obtain a composite risk. Hereinafter, this composite risk will be simply referred to as a risk R.

A risk map representing a distribution of the risk R is created in chronological order corresponding to future time points such as, for example, 0.1 seconds later, 0.2 seconds later, and so on. Obstacles OB include traffic participants such as vehicles, bicycles, and pedestrians. For each traffic participant, the risk setter 132 determines future positions using a known technology and calculates a risk corresponding to each future time point because the position of the traffic participant changes with time. When the value of the risk R is referenced later, a risk map is selected depending on how many seconds later the risk R corresponding to a trajectory point is to be acquired. Since this is not a core part of the present invention, detailed description thereof will be omitted. The distribution of the risk R set by the risk setter 132 is an example of a "surrounding situation of a mobile body."

The behavior plan generator 140 generates a path (a target path) along which the own vehicle M will travel in the future automatically (independently of the driver's operation) such that the own vehicle M basically travels in the recommended lane determined by the recommended lane determiner 61 and further copes with surrounding situations of the own vehicle M. The behavior plan generator 140 generates a path along which the own vehicle M will travel in the future automatically (independently of the driver's operation) such that it passes through points where the risk R is small. The path includes, for example, a speed element. The path is expressed, for example, by an arrangement of points (arrival points) which are to be reached by a reference position in the own vehicle M in order. Here, the reference position is, for example, the center of a front end, the center of gravity, the center of a rear wheel axle of the own vehicle M and it is assumed in the following description that the reference position is the center of the rear wheel axle. The arrival points are points to be reached by the own vehicle M at intervals of a predetermined travel distance (for example, at intervals of about several meters) along the road. Apart from this, a target speed and a target acceleration for each predetermined sampling time (for example, every several tenths of a second) are generated as a part of the path. The arrival points may be respective positions at the predetermined sampling times which the own vehicle M is to reach at the corresponding sampling times. In this case, information on the target speed or the target acceleration is represented by the interval between arrival points. Details of this will be described later.

The second controller 160 controls the travel driving force output device 200, the brake device 210, and the steering device 220 such that the own vehicle M passes through the path generated by the behavior plan generator 140 at scheduled times.

The second controller 160 includes, for example, an acquirer 162, a speed controller 164, and a steering controller 166. The acquirer 162 acquires information on the path (trajectory points) generated by the behavior plan generator 140 and stores it in a memory (not shown). The speed controller 164 controls the travel driving force output device 200 or the brake device 210 based on a speed element pertaining to the path stored in the memory. The steering controller 166 controls the steering device 220 according to the degree of bending of the path stored in the memory. The processing of the speed controller 164 and the steering controller 166 is realized, for example, by a combination of feedforward control and feedback control. As an example, the steering controller 166 performs feedforward control according to the curvature of the road ahead of the own vehicle M and feedback control based on deviation from the path in combination.

The travel driving force output device 200 outputs a travel driving force (torque) required for the vehicle to travel to steered wheels. The travel driving force output device 200 includes, for example, a combination of an internal combustion engine, an electric motor, a transmission, and the like and an electronic controller (ECU) that controls these. The ECU controls these components according to information input from the second controller 160 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second controller 160 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 may be an electronically controlled hydraulic brake device that controls an actuator according to information input from the second controller 160 and transmits the hydraulic pressure of the master cylinder to the cylinder.

The steering device 220 includes, for example, a steering ECU and an electric motor. The electric motor, for example, applies a force to a rack-and-pinion mechanism to change the direction of steered wheels. The steering ECU drives the electric motor according to information input from the second controller 160 or information input from the driving operators 80 to change the direction of the steered wheels.

A path generation method will be described below. The behavior plan generator 140 includes, for example, an initial path generator 142, a passage area setter 144, and a path corrector 146.

The initial path generator 142 generates an initial path along which the own vehicle M follows the center of a travel road (lane) as closely as possible without passing through points with a risk greater than a first predetermined value. The initial path generator 142 searches for an initial path, for example, until the sum of risk values at arrival points that constitute the initial path becomes less than a threshold value. At this time, the initial path generator 142 may search for an initial path using simultaneous perturbation stochastic approximation (SPSA) which is a type of stochastic gradient method using random variables. The initial path generator 142 connects arrival points at intervals of a predetermined distance to generate an initial path.

The passage area setter 144 sets boundaries of a passage area of the mobile body at positions that are offset to the left and right from the initial path (positions to which the initial path is translated to the left and right). When the path corrected by the path corrector 146 is fed back, the passage area setter 144 may similarly set boundaries of a passage area of the mobile body at positions that are offset to the left and right from the corrected path. Hereinafter, these processes will be referred to as "correcting a path" without distinguishing them.

Figure 5:
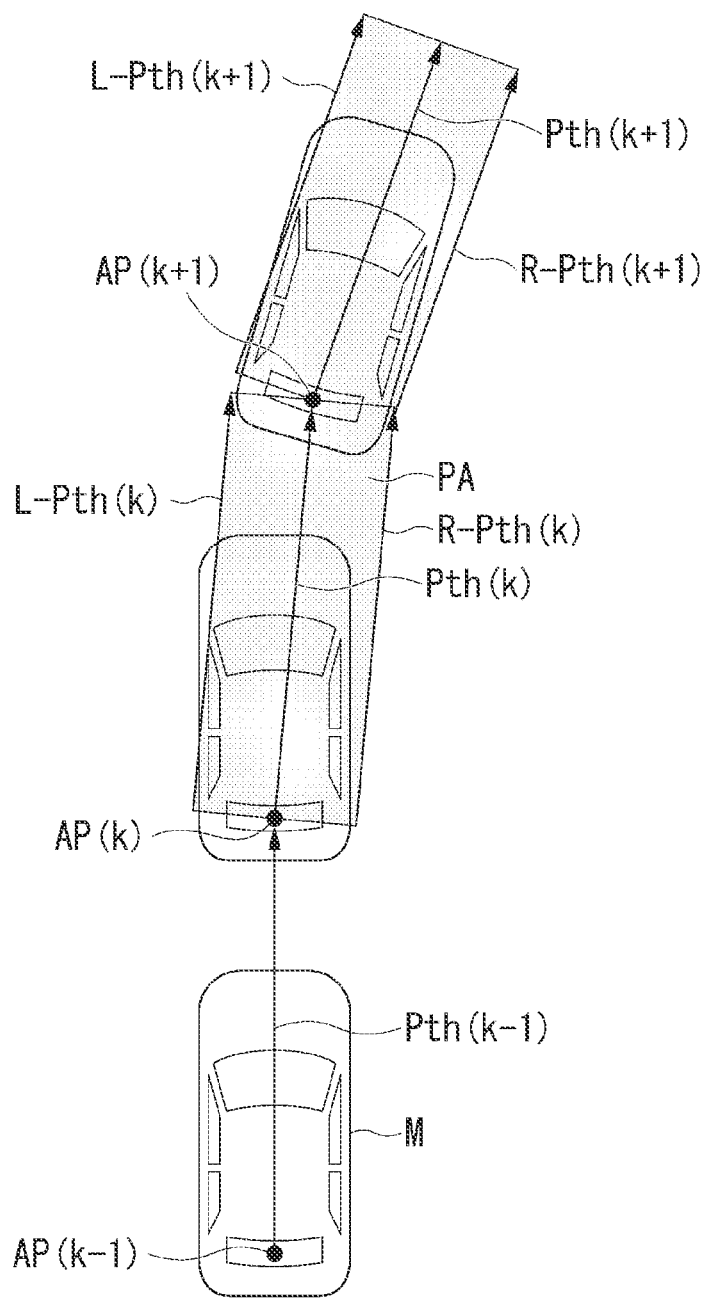
FIG. 5 is a diagram for explaining the content of processing by a passage area setter.

FIG. 5 is a diagram for explaining the content of processing by the passage area setter 144. In FIG. 5, AP(k) is a reference position of the own vehicle M at the time of calculation (t=k) (which is an arrival point set in a previous cycle), AP(k−1) is an arrival point one cycle before, and AP(k+1) is an arrival point one cycle after. Hereinafter, vector line segments between the arrival points will be referred to as unit paths. Pth(k−1) is a unit path from the arrival point AP(k−1) to the arrival point AP(k), Pth(k) is a unit path from the arrival point AP(k) to the arrival point AP(k+1), and Pth(k+1) is a unit path from the arrival point AP(k+1) to an arrival point AP(k+2). For example, the passage area setter 144 sets a left offset path L-Pth(k) that is offset to the left from the unit path Pth(k) and a right offset path R-Pth(k) that is offset to the right from the unit path Pth(k) and similarly sets a left offset path L-Pth(k+1) that is offset to the left from the unit path Pth(k+1) and a right offset path R-Pth(k+1) that is offset to the right from the unit path Pth(k+1) and sequentially performs such processing. Then, the passage area setter 144 appropriately connects a rectangular area defined by the left offset path L-Pth(k) and the right offset path R-Pth(k), a rectangular area defined by the left offset path L-Pth(k+1) and the right offset path R-Pth(k+1), and further rectangular areas set for subsequent control cycles to set a passage area PA of the own vehicle M.

It is assumed that there are gaps at the joints between the rectangular areas, but interpolation processing such as concatenating vertices may be performed.

Here, the unit path Pth(k) is inclined to the right relative to the unit path Pth(k−1). Similarly, the unit path Pth(k+1) is inclined to the right relative to the unit path Pth(k). Therefore, the passage area setter 144 determines that the path is turning to the right at the control times k and k+1, that is, the path includes a turn. At this time, the passage area setter 144 makes the amount of offset of the left offset path L-Pth(k) corresponding to the left side, which is the outside of the turn, from the unit path Pth(k) greater than the amount of offset of the right offset path R-Pth(k), which is inside the turn, from the unit path Pth(k) and makes the amount of offset of the left offset path L-Pth(k+1), which is outside the turn, from the unit path Pth(k+1) greater than the amount of offset of the right offset path R-Pth(k+1), which is inside the turn, from the unit path Pth(k+1). Thereby, the boundary lines of the passage area can be set at positions closest to a trajectory of the front wheel on the outside of the turn, which normally passes the outermost side of the turn.

Figure 6:
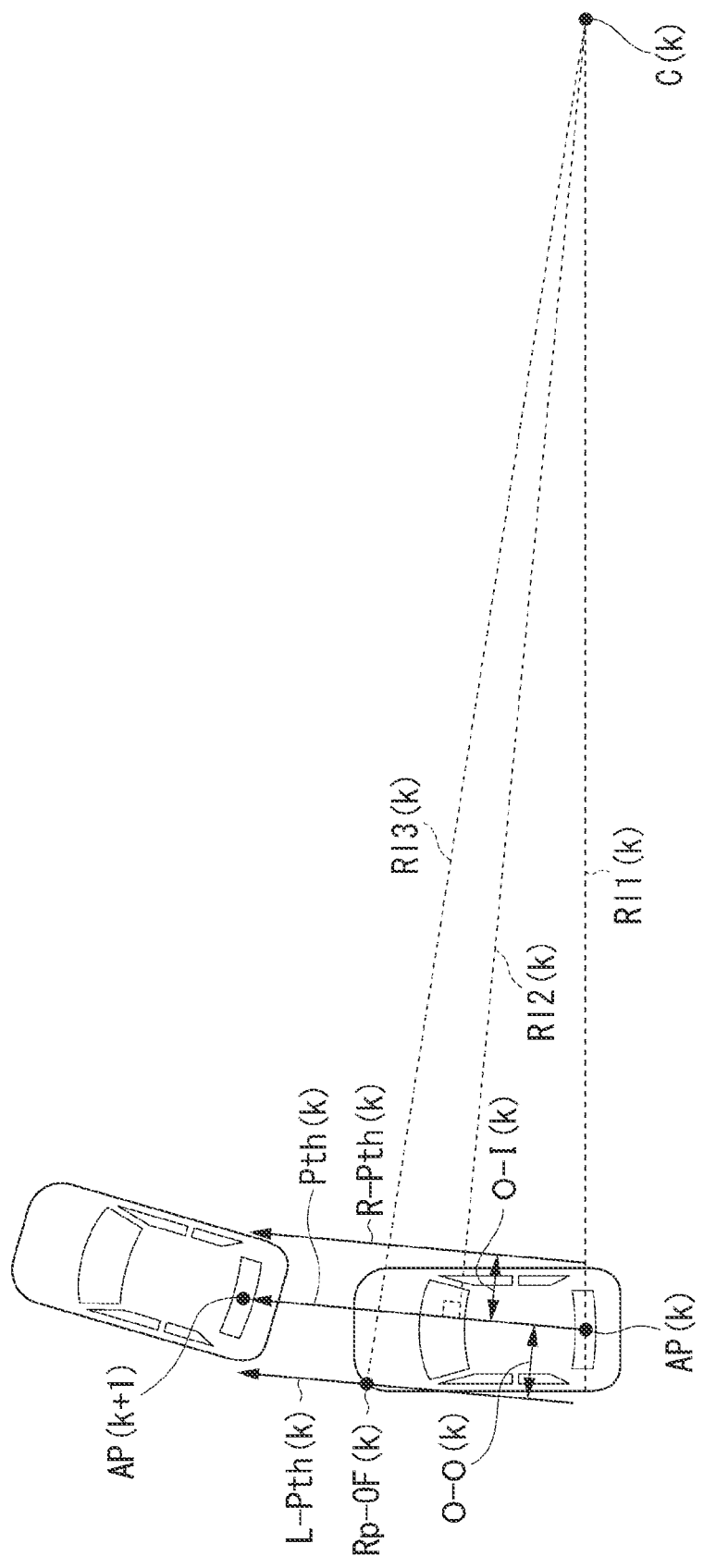
FIG. 6 is a diagram for explaining an example of a calculation method performed by a passage area setter.

Hereinafter, an example of a specific calculation method for performing the above processing will be described. FIG. 6 is a diagram for explaining an example of a calculation method performed by the passage area setter 144. The passage area setter 144 determines the amount by which the path is to be offset to the outside of the turn based on the position of a front wheel on the outside of the turn at the time when the reference position of the own vehicle M reaches each arrival point. More specifically, the passage area setter 144 determines the amount by which the unit path is to be offset to the outside of the turn based on a distance (a distance of Rl3($k$)) from the position Rp-OF(k) of the front wheel on the outside of the turn at the time when the reference position of the own vehicle M reaches each arrival point (t=k in FIG. 6) to a turn center C(k) which is obtained as the intersection between a reference line Rl1($k$) obtained by virtually extending the rear wheel axle of the own vehicle M to the inside of the turn (a reference line that passes through the reference position and extends to the side of the own vehicle M) and a perpendicular bisector Rl2($k$) of the unit path Pth(k). The passage area setter 144 sets a distance obtained by subtracting the distance of the perpendicular bisector Rl2($k$) from the distance of Rl3($k$) as an amount O-O(k) by which the path is to be offset to the outside of the turn.

On the other hand, the passage area setter 144 may determine that an amount O-I(k) by which the path is to be offset to the inside of the turn is half a tread width of the own vehicle M.

The distance of Rl3($k$) and the distance of Rl2($k$) can be obtained by the following equations (1) and (2) from the Pythagorean theorem. Then, the amount O-O(k) by which the path is to be offset to the outside of the turn can be obtained by equation (3).

$$Rl3(k) = \sqrt{[(\text{wheelbase of own vehicle } M)^2 + \{(\text{thread width of own vehicle } M)/2 + Rl1(k)\}^2]} \quad (1)$$

$$Rl2(k) = \sqrt{[\{Rl1(k)\}^2 - \{(\text{length of unit path})/2\}^2]} \quad (2)$$

$$O - O(k) = Rl3(k) - Rl2(k) \quad (3)$$

Figure 7:
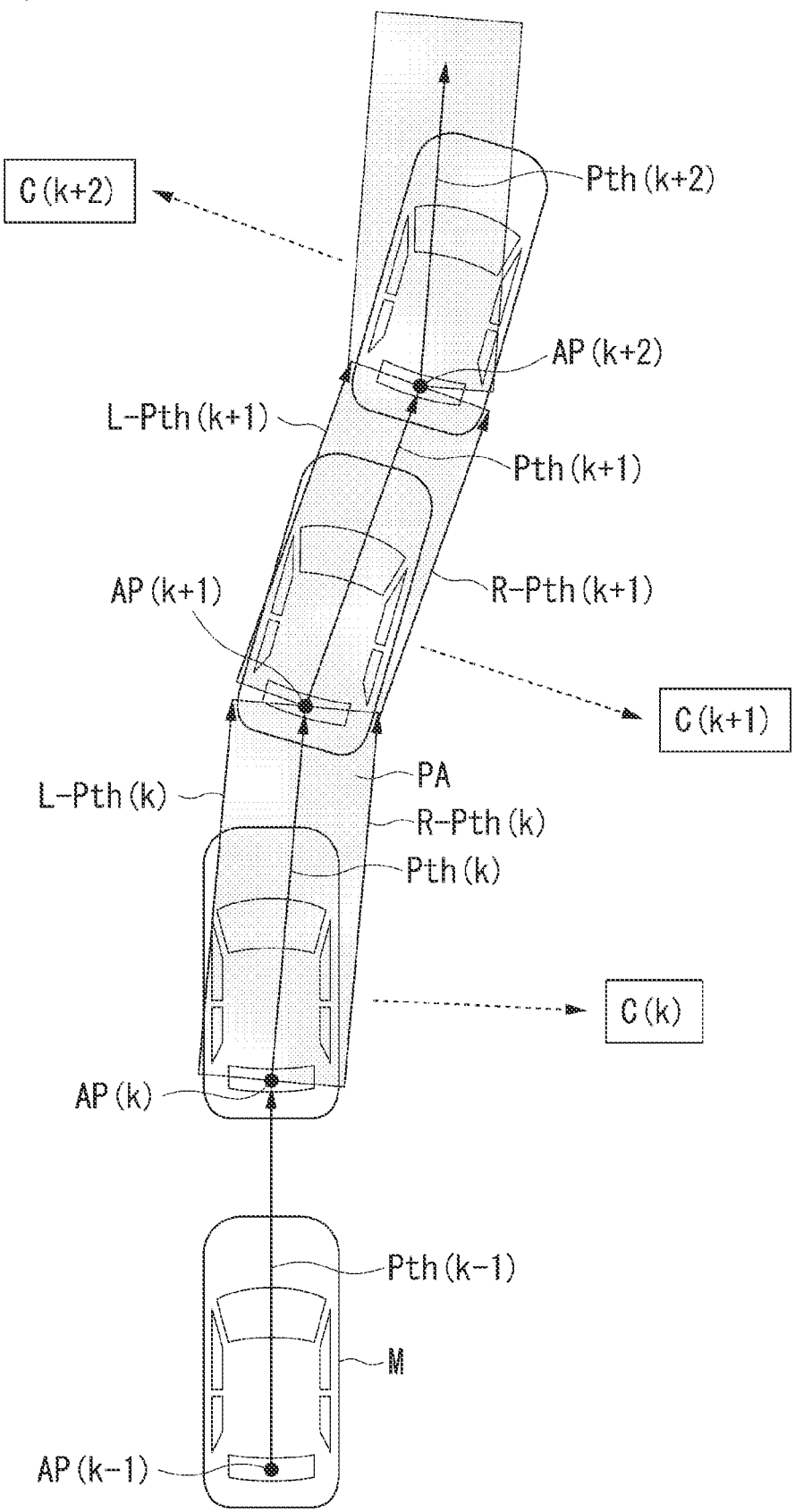
FIG. 7 is a diagram illustrating a change in a passage area when a turning direction changes midway.

FIG. 7 is a diagram illustrating a change in a passage area PA when the turning direction changes midway. In the shown example, the path switches from a right turn to a left turn at the arrival point AP(k+2). As a result, a passage area PA beyond the arrival point AP(k+2) is set such that the amount of offset to the right from the unit path Pth(k+2) is greater than the amount of offset to the left. A turn center C(k+2) calculated at this time is calculated as being on the left side of the own vehicle.

For example, the path corrector 146 acquires the risk again for positions included in the passage area PA set as described above, and if there is a position where the risk is equal to or greater than a second predetermined value, rotates a unit path corresponding to the position around its base point to change the passage area PA such that there is no position where the risk is equal to or greater than the second predetermined value. The second predetermined value may be a value greater than the first predetermined value referenced by the initial path generator 142.

The passage area setter 144 and the path corrector 146 repeat the process described above, for example, until there is no position in the passage area PA where the risk is equal to or greater than the second predetermined value. Thus, the trajectory of the own vehicle M is controlled such that all portions of the own vehicle M pass through areas where the risk is less than the second predetermined value. As a result, the automated driving control device 100 can more appropriately generate a path for the own vehicle M to move on a travel road involving turns.

In the above description, it is assumed that the automated driving control device 100 (a control device) is mounted in the own vehicle M (a mobile body). However, the present invention is not limited to this and the automated driving control device 100 may be installed at a location separated from the mobile body and remotely control the mobile body by acquiring output data from the camera 10, the radar device 12, the LIDAR device 14, the object recognition device 16, and the like through communication and transmitting generated path information to a functional unit corresponding to the second controller 160.

Although the modes for carrying out the present invention have been described above by way of embodiments, the present invention is not limited to these embodiments at all and various modifications and substitutions can be made without departing from the gist of the present invention.

What is claimed is:

1. A control device comprising:
   a storage medium configured to store computer-readable instructions; and
   a processor connected to the storage medium, the processor executing the computer-readable instructions to:
   recognize a surrounding situation of a mobile body;
   generate a path through which a reference position of the mobile body is to pass based on the surrounding situation;
   set boundary lines of a passage area of the mobile body at positions that are offset to the left and right from the path;
   correct the path based on the passage area and the surrounding situation of the mobile body; and
   control a drive device provided in the mobile body such that the mobile body moves along the corrected path,
   wherein setting the boundary lines of the passage area includes, when the path includes a turn, making an amount of offset on an outside of the turn greater than an amount of offset on an inside of the turn, and
   wherein the processor connects arrival points at intervals of a predetermined distance to generate the path, the reference position is a center of a rear wheel axel of the mobile body, and the processor determines an amount by which the path is to be offset to the outside of the turn based on a distance from a position of a front wheel on the outside of the turn at a time when the reference position of the mobile body reaches each arrival point to a turn center which is obtained as an intersection between a reference line that passes through the reference position of the mobile body and extends to a side of the mobile body and a line perpendicular to the path.

2. The control device according to claim 1, wherein the processor further determines the amount by which the path is to be offset to the outside of the turn based on a position of a front wheel on the outside of the turn at a time when the reference position of the mobile body reaches each arrival point.

3. The control device according to claim 1, wherein the processor repeats setting boundary lines of a passage area of the mobile body again at positions that are offset to the left and right from the corrected path and correcting the path again based on the passage area set again and the surrounding situation of the mobile body.

4. A control method performed using a control device, the control method comprising:
   recognizing a surrounding situation of a mobile body;
   generating a path through which a reference position of the mobile body is to pass based on the surrounding situation;
   setting boundary lines of a passage area of the mobile body at positions that are offset to the left and right from the path;
   correcting the path based on the passage area and the surrounding situation of the mobile body; and
   controlling a drive device provided in the mobile body such that the mobile body moves along the corrected path;
   connecting arrival points at intervals of a predetermined distance to generate the path, the reference position is a center of a rear wheel axel of the mobile body, and
   determining an amount by which the path is to be offset to the outside of the turn based on a distance from a position of a front wheel on the outside of the turn at a time when the reference position of the mobile body reaches each arrival point to a turn center which is obtained as an intersection between a reference line that passes through the reference position of the mobile body and extends to a side of the mobile body and a line perpendicular to the path,
   wherein setting the boundary lines of the passage area includes, when the path includes a turn, making an amount of offset on an outside of the turn greater than an amount of offset on an inside of the turn.

5. A computer-readable non-transitory storage medium storing a program causing a processor of a control device to:
   recognize a surrounding situation of a mobile body;
   generate a path through which a reference position of the mobile body is to pass based on the surrounding situation;
   set boundary lines of a passage area of the mobile body at positions that are offset to the left and right from the path;
   correct the path based on the passage area and the surrounding situation of the mobile body; and
   control a drive device provided in the mobile body such that the mobile body moves along the corrected path,
   wherein setting the boundary lines of the passage area includes, when the path includes a turn, making an amount of offset on an outside of the turn greater than an amount of offset on an inside of the turn, and
   wherein the processor connects arrival points at intervals of a predetermined distance to generate the path, the reference position is a center of a rear wheel axel of the mobile body, and the processor determines an amount by which the path is to be offset to the outside of the turn based on a distance from a position of a front wheel on the outside of the turn at a time when the reference position of the mobile body reaches each arrival point to a turn center which is obtained as an intersection between a reference line that passes through the reference position of the mobile body and extends to a side of the mobile body and a line perpendicular to the path.

* * * * *